(12) United States Patent
Palenius et al.

(10) Patent No.: US 9,509,427 B2
(45) Date of Patent: Nov. 29, 2016

(54) ADAPTIVE SUPPRESSION OF UNKNOWN INTERFERENCE

(71) Applicant: Telefonaktiebolaget L M Ericsson (publ), Stockholm (SE)

(72) Inventors: Torgny Palenius, Barsebäck (SE); Peter Alriksson, Hörby (SE); Joakim Axmon, Kävilinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/693,649

(22) Filed: Apr. 22, 2015

(65) Prior Publication Data
US 2016/0315728 A1    Oct. 27, 2016

(51) Int. Cl.
| | | |
|---|---|---|
| *G06F 15/16* | (2006.01) | |
| *H04J 11/00* | (2006.01) | |
| *H04W 48/16* | (2009.01) | |
| *H04W 36/00* | (2009.01) | |

(52) U.S. Cl.
CPC ........ *H04J 11/0073* (2013.01); *H04J 11/0036* (2013.01); *H04J 11/0056* (2013.01); *H04W 36/0061* (2013.01); *H04W 48/16* (2013.01)

(58) Field of Classification Search
CPC ... H04W 16/14; H04W 24/02; H04W 28/06; H04W 52/42
USPC ....... 455/63.1, 501, 524; 370/252, 329, 487, 370/488; 375/347–350
See application file for complete search history.

(56) References Cited

U.S. PATENT DOCUMENTS

| | | | |
|---|---|---|---|
| 5,615,409 | A | 3/1997 | Forssén et al. |
| 6,115,409 | A | 9/2000 | Upadhyay et al. |
| 6,898,235 | B1 | 5/2005 | Carlin et al. |
| 7,855,992 | B2 | 12/2010 | Xu et al. |
| 7,983,197 | B2 | 7/2011 | Axmon et al. |

(Continued)

FOREIGN PATENT DOCUMENTS

| | | |
|---|---|---|
| CN | 104185256 A | 12/2014 |
| EP | 2214439 A1 | 8/2010 |

(Continued)

OTHER PUBLICATIONS

Author Unknown, "Technical Specification Group Radio Access Network; Evolved Universal Terrestrial Radio Access (E-UTRA); Requirements for support of radio resource management (Release 11)," Technical Specification 36.133, Version 11.11.0, 3GPP Organizational Partners, Dec. 2014, 813 pages.

(Continued)

*Primary Examiner* — Sam Bhattacharya
(74) *Attorney, Agent, or Firm* — Withrow & Terranova, PLLC

(57) ABSTRACT

Systems and methods relating to suppressing interference during cell detection are disclosed. In some embodiments, a method of operation of a wireless device to perform cell detection comprises training one or more adaptive filters to spatially filter transmissions from one or more perceived directions of one or more sources of unknown interference and performing cell detection using the one or more adaptive filters to spatially filter transmissions from the one or more perceived directions of the one or more sources of the unknown interference. In this manner, cell detection in the presence of the unknown interference is improved.

18 Claims, 11 Drawing Sheets

(56) References Cited

U.S. PATENT DOCUMENTS

| | | | |
|---|---|---|---|
| 8,102,956 | B2 | 1/2012 | Dai et al. |
| 2002/0137538 | A1 | 9/2002 | Chen et al. |
| 2003/0142756 | A1 | 7/2003 | Kohno et al. |
| 2004/0071207 | A1 | 4/2004 | Skidmore et al. |
| 2004/0248519 | A1 | 12/2004 | Niemela |
| 2008/0122627 | A1 | 5/2008 | Chang et al. |
| 2012/0087263 | A1 | 4/2012 | Li et al. |
| 2012/0315938 | A1* | 12/2012 | Van Nee ............... H04B 7/0434 455/507 |
| 2013/0188499 | A1 | 7/2013 | Mach et al. |
| 2013/0244594 | A1 | 9/2013 | Alrabadi et al. |
| 2013/0279437 | A1 | 10/2013 | Ng et al. |
| 2014/0155072 | A1 | 6/2014 | Hellmann |
| 2014/0286298 | A1 | 9/2014 | Yoshimoto et al. |
| 2015/0063253 | A1 | 3/2015 | Barbieri et al. |
| 2015/0117341 | A1 | 4/2015 | Ohwatari et al. |
| 2015/0341846 | A1 | 11/2015 | Shi et al. |
| 2015/0365882 | A1 | 12/2015 | Yang et al. |

FOREIGN PATENT DOCUMENTS

| | | |
|---|---|---|
| EP | 2360967 B1 | 11/2011 |
| WO | 2013/056150 A1 | 4/2013 |
| WO | 2014/135204 A1 | 9/2014 |

OTHER PUBLICATIONS

Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.

Author Unknown, "Technical Specification Group Radio Access Network; Evolved Universal Terrestrial Radio Access (E-UTRA);Physical channels and modulation (Release 12)," Technical Specification 36.211, Version 12.3.0, 3GPP Organizational Partners, Sep. 2014, 124 pages.

Lisheng, L. et al., "MAP Receiver with Spatial Filters for Suppressing Cochannel Interference in MIMO-OFDM Mobile Communications," IEEE 68th Vehicular Technology Conference, Sep. 21-24, 2008, pp. 1-5.

NTT DOCOMO, INC. et al., "Rp-142307: New SI proposal: Performance-enhancements for high speed scenario," 3rd Generational Partnership Project (3GPP), TSG RAN Meeting #66, Dec. 8-12, 2014, 7 pages, Maui, Hawaii.

Widrow, B. et al., "Adaptive Signal Processing," Prentice-Hall, Inc., 1985, pp. 372-383.

International Search Report and Written Opinion for International Patent Application No. PCT/EP2016/057409, mailed Jun. 20, 2016, 10 pages.

Ericsson, "R4-152849: Modified arrangement for RRH based model," 3rd Generation Partnership Project (3GPP), TSG RAN WG4 Meeting #75, May 25-29, 2015, 8 pages, Fukuoka, Japan.

International Search Report and Written Opinion for International Patent Application No. PCT/EP2016/051888, mailed Mar. 16, 2016, 14 pages.

International Search Report and Written Opinion for International Patent Application No. PCT/EP2016/051878, mailed Apr. 25, 2016, 9 pages.

Non-Final Office Action for U.S. Appl. No. 14/694,604, mailed Aug. 25, 2016, 19 pages.

Non-Final Office Action for U.S. Appl. No. 14/694,620, mailed Jun. 24, 2016, 12 pages.

\* cited by examiner

ADAPTIVE SUPPRESSION OF UNKNOWN INTERFERENCE

TECHNICAL FIELD

The present disclosure relates to cell detection in a cellular communications network and more particularly relates to suppressing interference during cell detection.

BACKGROUND

Mobility criteria in current wireless systems are typically based on downlink measurements of absolute received signal power or signal to noise/interference ratio. Mobility criteria include, for example, when to activate inter-Radio Access Technology (RAT)/frequency measurements and when to hand over the User Equipment (UE) to another base station or network node.

With regard to mobility, when in idle mode, the UE measures the neighbor cells and camps on the best cell. In connected mode, the UE measures and reports the best neighbor cells to the network and, based on these reports, the network decides when to perform a handover for the UE. Thus, in both idle mode and connected mode, the mobility of the UE is based on detection of neighbor cells by the UE. In $3^{rd}$ Generation Partnership Project (3GPP) Long Term Evolution (LTE), the UE performs cell detection by searching for Primary Synchronization Signal (PSS) and Secondary Synchronization Signal (SSS) transmissions. By detecting the PSS and SSS transmissions from a cell, the UE is able to find the correct cell timing (via PSS) and cell identity (via SSS) of the cell. In $3^{rd}$ Generation (3G) wireless systems, cell detection is performed in a similar way.

In LTE, detection of a cell is, as is well known in the art, based on matched filtering using three PSS versions over at least 5 milliseconds (ms) of received samples. Correlation peaks in the filter output may reveal synchronization signals from one or more cells. This is referred to as symbol synchronization. Upon having established symbol synchronization and identified the cell-within-group Identity (ID) of the cell, the next step is SSS detection to acquire frame timing and physical layer cell identity. After decoding the SSS, the cell group ID and thereby the full physical layer cell ID is acquired. Moreover, frame timing and cyclic prefix configuration are determined. The pair of PSS and SSS is always transmitted from the same antenna port of the network node, but different pairs may be transmitted from different antenna ports, as defined in 3GPP Technical Specification (TS) 36.211 V12.3.0, Section 6.11.

One issue with cell detection is that interference can prevent detection of cells, particularly in situations where the interference is strong relative to the perceived strength of the PSS/SSS transmissions at the UE. This interference generally falls into two categories, namely, known interference and unknown interference. Known interference is interference that results from transmission of known signals from one or more interference sources. For instance, the known interference may be transmission of PSS/SSS by known cells (i.e., cells previously detected by the UE such as the PSS/SSS transmissions by a current or previous serving cell of the UE). Conversely, unknown interference is interference that results from transmission of unknown signals from one or more sources (e.g., transmission of unknown signals from other cells or UEs and/or transmissions from wireless nodes in other wireless systems such as transmissions from wireless nodes in a WiFi network).

For instance, when searching for a new cell in an LTE system that operates in a licensed frequency band, the received signal consists of signals from cells and, in Time Division Duplexing (TDD) modes, signals from other UEs. In LTE TDD, as well as in Time Division Synchronous Code Division Multiple Access (TDSCDMA), there are uplink and downlink timeslots which operate on the same frequency in a time-division manner. When a cell search is starting on a new band with LTE TDD, the UE does not know the timing of the uplink and downlink slots. The UE will thus receive interference from base stations transmitting in the downlink direction as well as UEs transmitting in the uplink direction. There are also discussions on having full duplex on the same carrier frequency; this will result in UEs transmitting continuously in the uplink that will cause interference in the downlink to another UE.

Further, the LTE system is planned to be deployed in unlicensed bands in the future. In this case, there may be other kinds of interference sources operating on the same frequency. These interference sources may be WiFi transmissions, Bluetooth, radar transmitters, etc.

Interference that degrades cell detection is particularly problematic in new modern deployment scenarios. For example, consider a scenario where the UE, due to strong interference, cannot detect new cells and, as a result, the possibility to change to another cell is limited. For dense deployments and small cell scenarios, it is necessary to detect weak neighbor cells for potential handover early in order to avoid long handover interruption or radio link failure. If a neighbor cell cannot be identified before the UE reaches the cell border, the likelihood of the UE dropping a data connection or a call increases, and the UE might not even be able to receive a handover command before losing connection to the serving cell.

Further, existing 3GPP requirements on mobility measurements and event triggering as captured in 3GPP TS 36.133 V12.4.0 have been derived with mobility at low speed in mind and for cells with a Signal to Interference Plus Noise Ratio (SINR) of −6 decibels (dB) or higher unless enhanced Inter-Cell Interference Coordination (eICIC) or further eICIC (feICIC)—both of which require tight coordination between cells—is used. A UE implementation that just barely fulfills those requirements will face big challenges in the new deployment scenarios described above.

As such, there is a need for systems and methods for improving cell search particularly in the presence of unknown interference without impacting UE complexity.

SUMMARY

Systems and methods relating to suppressing interference during cell detection are disclosed. In some embodiments, a method of operation of a wireless device to perform cell detection comprises training one or more adaptive filters to spatially filter transmissions from one or more perceived directions of one or more sources of unknown interference and performing cell detection using the one or more adaptive filters to spatially filter transmissions from the one or more perceived directions of the one or more sources of the unknown interference. In this manner, cell detection in the presence of the unknown interference is improved since the relative level of interference and noise is reduced.

In some embodiments, performing cell detection using the one or more adaptive filters comprises executing Primary Synchronization Signal (PSS) detection while spatially filtering transmissions from the one or more perceived directions of the one or more sources of the unknown interference using the one or more adaptive filters. Further, in some embodiments, executing PSS detection comprises adaptively filtering signals received via two or more active receive antennas of the wireless device using the one or more adaptive filters to thereby provide one or more filtered signals in which transmissions from the one or more perceived directions of the one or more sources of the unknown interference have been suppressed and detecting a PSS based on the one or more filtered signals.

In some embodiments, the one or more adaptive filters is a single adaptive filter, the one or more filtered signals is a single filtered signal, and adaptively filtering the signals received via the two or more active receive antennas of the wireless device comprises applying a set of weights for the single adaptive filter to the signals to provide weighted signals and combining the weighted signals to provide the single filtered signal. The set of weights is a single set of weights for a full bandwidth in which the PSS is to be detected.

In some embodiments, the one or more adaptive filters is two or more adaptive filters for two or more sub-bands of a bandwidth in which the PSS is to be detected, respectively. The one or more filtered signals is two or more filtered signals. Adaptively filtering the signals received via the two or more active receive antennas of the wireless device comprises filtering the signals received via the two or more active receive antennas to provide received signals for each of the two or more sub-bands; and, for each sub-band of the plurality of sub-bands, applying a set of weights for the sub-band to the received signals for the sub-band to provide weighted signals for the sub-band, and combining the weighted signals for the sub-band to provide the filtered signal for the sub-band.

In some embodiments, the method of operation of the wireless device further comprises determining a number of receive antennas of the wireless device to utilize for the one or more adaptive filters when performing cell detection. In some embodiments, determining the number of receive antennas of the wireless device to utilize for the one or more adaptive filters when performing cell detection comprises determining the number of receive antennas of the wireless device to utilize based on at least one of a group consisting of: mobility of the wireless device; a number of cells already detected by the wireless device on the same carrier frequency; signaling from a cellular network node serving the wireless device; a configuration from the cellular network node serving the wireless device; one or more predefined rules; a battery status of the wireless device; a number of strong cells already detected by the wireless device on one or more other carriers; and a number of strong cells already detected by the wireless device on one or more other radio access technologies.

In some embodiments, a signal strength of the unknown interference is strong relative to a signal strength of one or more predetermined signals utilized for cell detection.

Embodiments of a wireless device configured to perform cell detection using one or more adaptive filters to spatially filter transmissions from one or more perceived directions of one or more sources of unknown interference are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for suppressing interference, particularly unknown interference, while performing cell detection. More specifically, adaptive filtering is utilized to suppress transmissions from a perceived direction(s) of a source(s) of interference when performing cell detection. By using adaptive filtering, the suppressed interference can be unknown interference. In this manner, cell detection is particularly improved in the presence of unknown interference.

Figure 1:
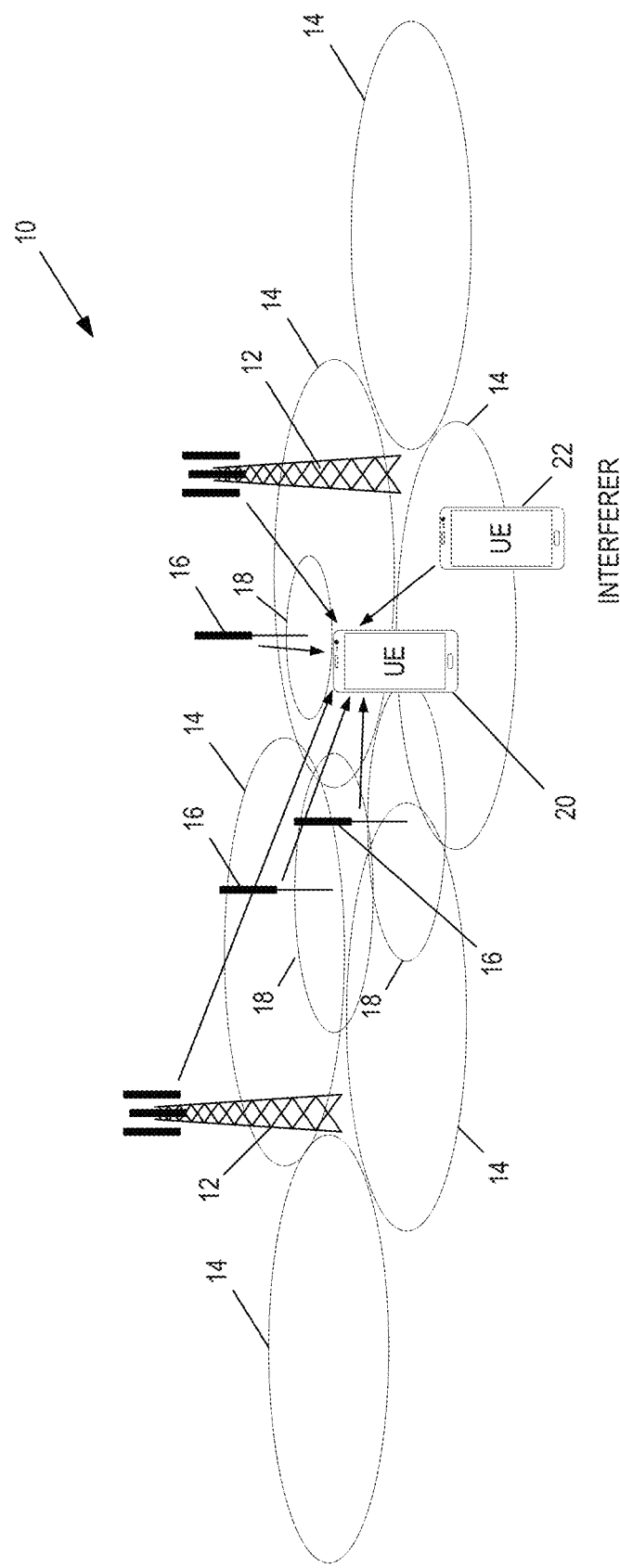
FIG. 1 illustrates a cellular communications network according to some embodiments of the present disclosure.

FIG. 1 illustrates one example of a cellular communications network, or wireless system, 10 in which a User Equipment (UE) operates to suppress interference during cell detection according to some embodiments of the present disclosure. In some embodiments, the cellular communications network 10 is a $3^{rd}$ Generation Partnership Project (3GPP) Long Term Evolution (LTE) network and, as such, 3GPP LTE terminology is sometimes used herein. However, the present disclosure is not limited to 3GPP LTE. Rather, the concepts disclosed herein can be utilized to improve cell detection in any suitable type of cellular communications network.

As illustrated, a Radio Access Network (RAN) of the cellular communications network 10 includes a macro cell layer and a small cell layer. The macro cell layer includes a number of macro cell base stations 12 that serve corresponding macro cells 14. In LTE, the macro cell base stations 12 are referred to as enhanced or evolved Node Bs (eNBs). The generic term network node may be used in some embodiments. In this example, each of the macro cell base stations 12 serves three cells. The small cell layer includes a number of small cell base stations 16 that serve corresponding small cells 18. In LTE, the small cell base stations 16 may be referred to as micro base stations, pico base stations, femto base stations, home base stations (i.e., home eNBs (HeNBs)), or the like.

A UE 20 is served by the cellular communications network 10. Notably, as used herein, a UE 20 is to be understood as any type of wireless device served by the cellular communications network 10 (e.g., a smart phone, a tablet computer, a machine-type communication device, a dongle, etc.). During cell detection, the UE 20 experiences interference, potentially from multiple different sources. For instance, if the UE 20 is attempting to detect relatively weak neighbor cells (e.g., one of the small cells 18) while being served by a strong cell (e.g., one of the macro cells 14), the UE 20 may experience known interference from the strong cell, which is a previously detected or known cell, as well as unknown interference from one or more sources of the unknown interference. In the illustrated example, the unknown interference includes interference resulting from uplink transmissions of another UE 22. Such interference may occur in LTE Time Division Duplexing (TDD) mode where the UE 22 may transmit on the same carrier frequency on which the UE 20 is performing cell detection. Notably, while the UE 22 is illustrated as the source of the unknown interference in this example, additional or alternative sources of the unknown interference may be present. For example, if the cellular communications network 10 is operating on an unlicensed frequency band, the UE 20 may receive unknown interference from other wireless systems operating in the same frequency band (e.g., interference from a WiFi device, a Bluetooth device, or the like).

The desired and interfering signals impinge on the antennas of the UE 20 from different directions. In other words, the UE 20 will experience different radio propagation channels and directions of arrival for signals from different sources (e.g., different cells, other UEs, wireless devices in other wireless systems, etc.). As described below, the UE 20 utilizes this fact to suppress transmissions from one or more perceived directions of one or more sources of the unknown interference during cell detection using one or more adaptive filters. In particular, the adaptive filter(s) is(are) configured to suppress (also referred to herein as block or spatially filter) transmissions from the one or more perceived directions of the one or more sources of unknown interference. As used herein, a perceived direction should be understood as being decoupled from geographic coordinates. A transmission impinges on N receive antennas from a particular perceived direction if the same transmission received on two or more of the N receive antennas has a given phase difference. This phase difference corresponds to the perceived direction from which the transmissions impinge the N receive antennas. In case there is an inherent phase difference between antennas on the transmitter side (e.g., at the network node) and/or the receiver side (e.g., at the UE), the phase difference of the received signals will partly depend on said phase differences and partly on the direction from which the signals are received. For the general case of at least some of said phases being unknown to the UE, it cannot deduce the geographical direction although it perceives the signal as coming from a particular direction. The term "perceived direction" is used to emphasize that it can be different from a geographical direction.

In general, the UE 20 reduces the interference power from the perceived direction of the main interferer or, with more than two antennas, the power of several interferers. This is particularly beneficial in cases where the main interferer(s) is(are) much stronger than the desired signal for cell detection. As discussed below, the reduction of the interference power is provided by adaptive interference suppression where the adaptive interference suppression (e.g., adaptive filter weights) is adaptively adjusted to reduce the received interference power by suppressing the antenna gain from the perceived direction(s) of the strongest interferer(s). In this manner, the received signal in the perceived direction of the strongest interferer is reduced, and cell detection performance of cells received from other perceived directions is enhanced. The adaptive interference suppression (e.g., by applying adaptive filter weights) may be updated periodically as needed or desired. In some embodiments, cell detection is performed both with and without this interference suppression in order to not degrade performance of cell detection for cells for which Primary Synchronization Signal (PSS)/Secondary Synchronization Signal (SSS) transmissions impinge on the UE 20 from the same perceived direction(s) as the perceived direction(s) that is(are) suppressed.

Notably, the interference suppression described herein may be used as an alternative to or in addition to other interference suppression techniques. For instance, the interference suppressions disclosed herein may be utilized in addition to suppression of interference resulting of predetermined signals (e.g., PSS or SSS) from previously detected cells (e.g., the serving cell or a previous serving cell) of the UE 20 as described in U.S. Provisional Patent Application No. 62/110,166, filed Jan. 30, 2015, and U.S. Provisional Patent Application No. 62/110,193, filed Jan. 30, 2015, both of which are hereby incorporated herein by reference in their entireties.

Using N receive (Rx) antennas, the UE 20 can suppress up to N−1 perceived directions (as manifested by relative phase difference(s) between instances of a signal component received on two or more Rx antennas). In particular, the UE 20 can utilize the interference suppression techniques described herein to suppress unknown interference, i.e., interference for which there are no channel estimations available. Using the interference suppression techniques described herein, the UE 20 can improve cell detection, particularly of weak cells for which received power at the UE 20 is significantly less than the interference power, without significantly increasing the complexity of the UE 20.

The UE 20 suppresses unknown interference by adaptively filtering the signals received via two or more Rx antennas of the UE 20 such that transmission from one or more perceived directions of one or more sources of interference are suppressed (also referred to herein as blocked or spatially filtered). Using adaptive filtering, the signals received on different Rx antennas are weighted and combined in such a manner that the antenna gain for the perceived direction(s) of the source(s) of interference is(are) suppressed since, after weighting, the signals add destructively and ideally completely cancel one another. This may also have an impact on desired signal components. Specifically, in the case where desired signal components impinge on the Rx antennas of the UE 20 with the same relative amplitude and phase as the undesirable signal components, they too will be suppressed as the UE 20 sees those desired signal components coming essentially from the same direction as the undesirable signal components. For desirable signal components impinging from other perceived directions, there might be degradation of the absolute amplitude, but the Signal to Interference plus Noise Ratio (SINR) will increase due to reduced interference, and hence the likelihood of detecting the associated cell is improved.

In some embodiments, the UE 20 has two Rx antennas and, as such, is limited to suppressing transmissions from only one perceived direction. In order to improve the chances of detecting weak cells in the presence of more than one strong interferer, the UE 20 may suppress strong interferers one at a time, i.e., use two or more sets of aforementioned adaptive filtering weights.

In other embodiments, the UE 20 has more than two Rx antennas and, as such, can, if desired, suppress transmissions from two or more perceived directions. Further, in some embodiments, the UE 20 can decide how many Rx antennas to use for adaptively cancelling the interference based on one or more predefined criteria. As an example, one reason to not always use all available Rx antennas is the power penalties of having additional active receiver(s) and the increased baseband processing. This is particularly the case for inter-frequency measurements and when in Discontinuous Reception (DRX). The decision on how many Rx antennas to use for adaptive filtering may further be influenced by any one or more of the following:

- Mobility: For instance, the UE 20 may search for weak cells more often when mobile than when stationary, particularly when in ultra-dense or small cell deployment areas, as, e.g., deduced by the UE 20 based on history or as deduced from signaling from the cellular communications network 10. In a high mobility scenario, it becomes more critical to quickly find handover candidates and, as such, the number of Rx antennas used in a high mobility scenario may be increased as compared to the number used in a low mobility scenario.
- Number of cells already detected on the particular carrier. Thus, for example, if the UE 20 has already detected several handover candidates, then it is less critical to identify new cells and, as such, the number of Rx antennas used for adaptive filtering may be decreased as compared to a scenario where the UE 20 has not already detected several handover candidates.
- Signaling/configuration from the cellular communications network 10, including both explicit configuration and event-triggered UE behavior.
- Fulfilled conditions according to a rule in the applicable standard (e.g., 3GPP Evolved Universal Terrestrial Radio Access (EUTRA)).
- Battery status and number of strong cells found on other carriers and other Radio Access Technologies (RATs). For example, if battery is low and there are handover candidates (also for other RATs), then the UE 20 can reduce the measurement efforts by reducing the number of Rx antennas used.

The UE 20 utilizes one or more adaptive filters together with at least two Rx antennas to suppress (also referred to herein as block or spatially filter) transmissions from the perceived direction(s) of the strongest interferer(s). This can be done, e.g., when the interfering signal is not identified so the UE 20 cannot make a channel estimate of the received interference. The adaptive filter(s) estimates the relative phase and amplitude between signal(s) received on different Rx antennas and cancels any signal from each such estimated direction (i.e., perceived direction).

Figure 2:
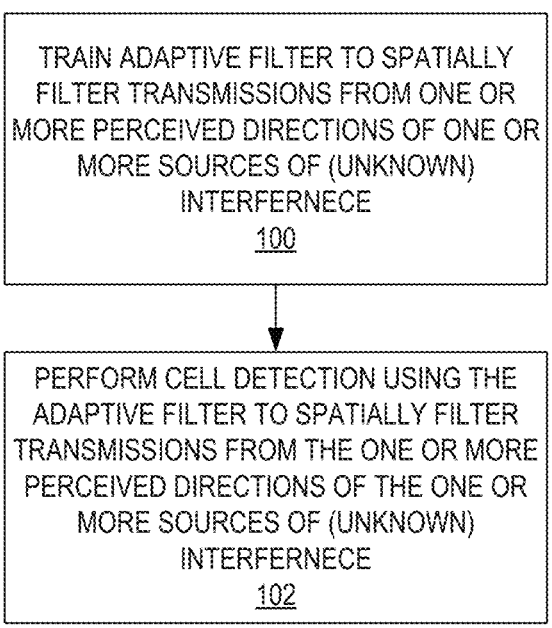
FIG. 2 is a flow chart that illustrates the operation of a wireless device to perform cell detection while suppressing interference according to some embodiments of the present disclosure.

FIG. 2 is a flow chart that illustrates the operation of the UE 20 according to some embodiments of the present disclosure. As illustrated, the UE 20 trains (e.g. calculates) one or more adaptive filters to spatially filter transmission from one or more perceived directions of one or more sources of interference (step 100). Because the strength of the received interference is strong relative to desired signal components, configuring the adaptive filter in this manner will set the adaptive filter weights to suppress transmissions arriving at the UE 20 from the perceived direction of the source(s) of the strong interference. Notably, while the interference is referred to in step 100 as being unknown, the technique may also be used to block any interference whether known or unknown. The point is that the UE 20 does not need to be able to estimate the radio propagation channel(s) of the interference in order to provide interference suppression since the adaptive filter(s) is(are) trained without the need for knowledge of the radio propagation channel(s) of the interference. The UE 20 performs cell detection using the adaptive filter(s) to spatially filter transmissions from the perceived direction(s) of the source(s) of interference (step 102).

Notably, while steps 100 and 102 are illustrated separately, the adaptive filter(s) may be trained prior to or even during cell detection. For instance, in some embodiments, the adaptive filter(s) is(are) trained prior to performing cell detection during a period of time in which the UE 20 knows to detect strong interference. In some other embodiments, the adaptive filter(s) is(are) trained during cell detection. For instance, the adaptive filter(s) may be adaptively configured (e.g., periodically updated) while performing cell detection. As a result, when strong interference is present, the adaptive filter(s) will operate to suppress transmissions from the perceived direction(s) of the source(s) of that strong interference. When strong interference is not present, assuming that the adaptive filter(s) is still active, the adaptive filter(s) will degrade the desired signal. As such, in these embodiments, it is beneficial to perform cell detection both with and without adaptive filtering in order to not degrade cell detection when either: (a) strong interference is not present or (b) strong interference is present but transmissions from a cell that is desirable to detect are from the same perceived direction(s) as that of the strong interference.

Figure 3:
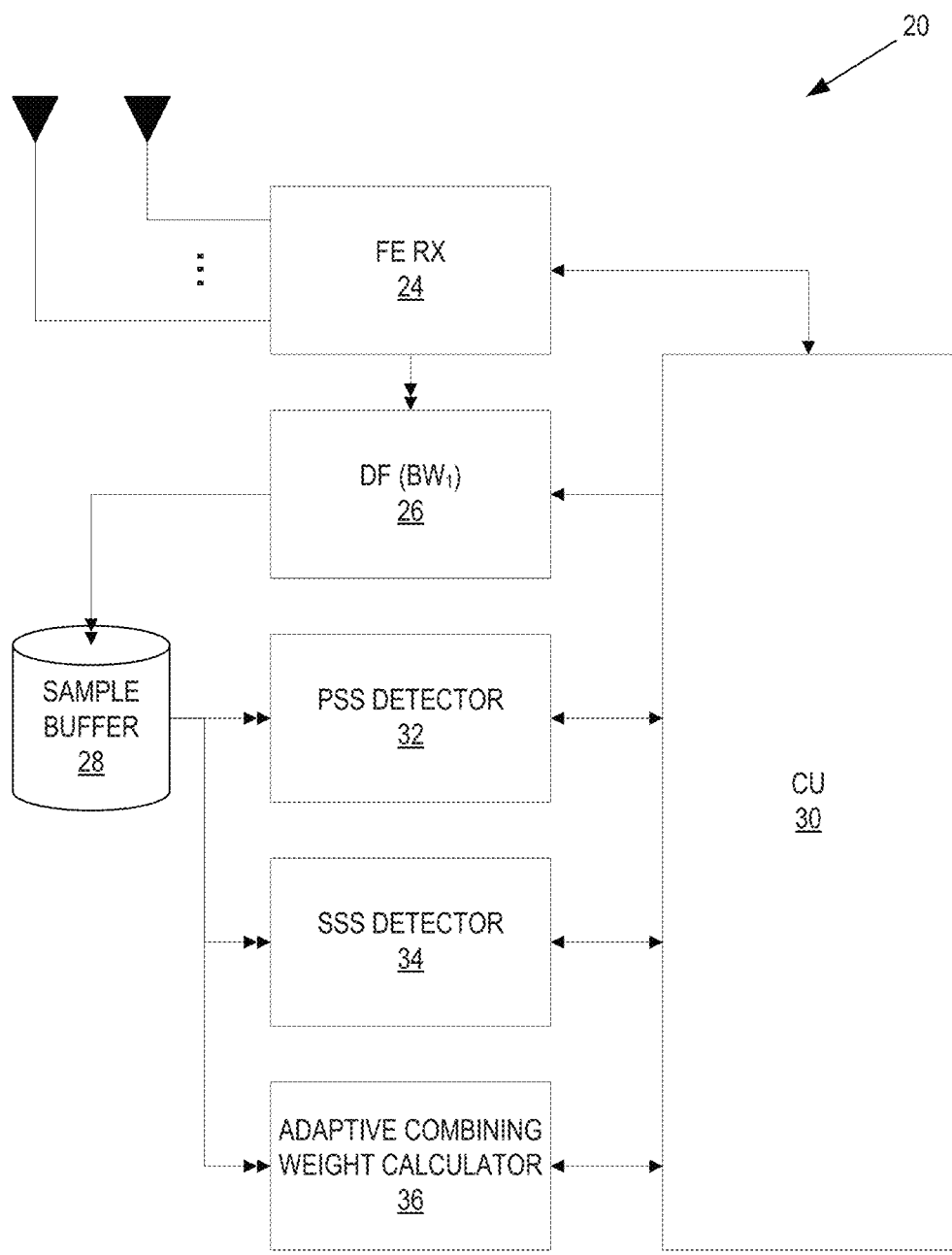
FIG. 3 is a block diagram of a wireless device, or User Equipment (UE), that operates to suppress interference during cell detection according to some embodiments of the present disclosure.

FIGS. 3 through 7 relate to embodiments of the present disclosure in which the UE 20 performs cell detection by detecting PSS and SSS transmissions of the detected cell according to some embodiments of the present disclosure. In particular, FIG. 3 is a block diagram of the UE 20 according to some embodiments of the present disclosure. As will be appreciated by one of ordinary skill in the art, the UE 20 may include additional components that are not illustrated in FIG. 3.

As illustrated, the UE 20 includes a radio front-end receiver (FE RX) 24 coupled to two or more Rx antennas. The radio front-end receiver 24 includes various analog and, in some implementations, digital circuitry such as, for example, amplifiers, filters, mixers, Analog-to-Digital Converters (ADCs), or the like, or any combination thereof. Signals received by the radio front-end receiver 24 via the Rx antennas are passed through a digital filter (DF) 26 having a passband, or bandwidth, $BW_1$ that corresponds to, for LTE, the six Radio Bearer (RB) bandwidth in which PSS is transmitted. The digital filter 26 narrows down the signal bandwidth and sampling rate to the bandwidth of interest for mobility measurements, which is usually equivalent to the smallest EUTRA system downlink bandwidth for LTE. The resulting received samples for the filtered signals received from the two or more Rx antennas are stored in a sample buffer 28 (i.e., memory) for further processing. The radio front-end receiver 24 and the digital filter 26 are both controlled by a control unit (CU) 30.

The UE 20 also includes a PSS detector, or PSS detection unit, 32, which may be realized or implemented in hardware or a combination of hardware and software. The PSS detector 32 operates to perform PSS detection while suppressing interference using one or more adaptive filters. The UE 20 also includes a SSS detector, or SSS detection unit, 34, which may be realized or implemented in hardware or a combination of hardware and software. The SSS detector 34 operates to detect a SSS for a cell (i.e., for a cell for which PSS was detected) using the one or more adaptive filters. For instance, as discussed above, the adaptive filter(s) may be trained during PSS detection. Then, once a PSS is detected, the corresponding adaptive filter weights are utilized to filter the received signals for SSS detection.

An adaptive weight calculator, or adaptive weight calculator unit, 36 operates to calculate or train the adaptive filter weights for the adaptive filter(s) utilized for interference suppression. The adaptive weight calculator 36 may be implemented in hardware or a combination of hardware and software. Notably, while illustrated separately, if implemented in software, the different components (e.g., the SSS detector 34 and the adaptive weight calculator 36) may be executed by the same processor(s), or processing circuitry (e.g., the same microprocessor(s)).

The control unit 30 configures the radio front-end receiver 24 to receive and store IQ samples for mobility measurements and, in some embodiments, also decides how many of the Rx antennas to use for in the acquisition of the IQ samples (which is the number of Rx antennas to use for adaptive filtering). The control unit 30 may be implemented in hardware or a combination of hardware and software (e.g., one or more processors or processing circuitry and software stored in memory that is executable by the control unit 30).

Figure 4:
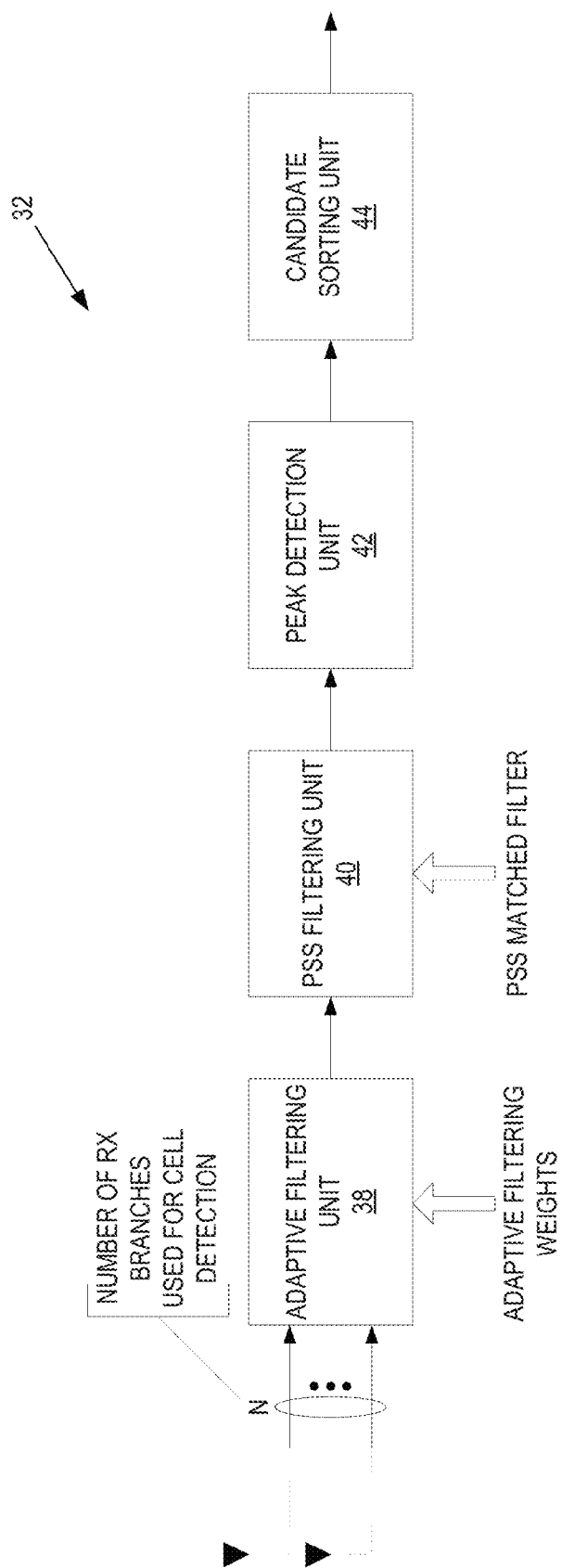
FIG. 4 is a block diagram of a Primary Synchronization Signal (PSS) detector of the UE of FIG. 3 according to some embodiments of the present disclosure.

FIG. 4 is a block diagram that illustrates the PSS detector 32 in more detail according to some embodiments of the present disclosure. As illustrated, the PSS detector 32 includes an adaptive filtering unit 38 that includes one or more adaptive filters, a PSS filtering unit 40, a peak detection unit 42, and a candidate sorting unit 44. The adaptive filtering unit 38 includes one or more adaptive filters. The combining weights of the adaptive filter(s) are configured by the adaptive weight calculator 36. While embodiments of the adaptive filtering unit 38 are described below, in some embodiments the adaptive filtering unit 38 includes an adaptive filter that operates over the entire bandwidth of interest for PSS detection. This adaptive filter applies the combining weights to the receive signals from the N active Rx antennas (i.e., the N Rx antennas that are active for adaptive filtering, where N≥2), respectively. The weighted receive signals from the N active Rx antennas are combined (coherently accumulated) to provide a filtered receive signal. The weights of the adaptive filter are configured such that transmissions that impinge on the N active Rx antennas from the perceived direction(s) of the source(s) of the (unknown) interference are suppressed, or spatially filtered.

The PSS filtering unit 40, the peak detection unit 42, and the candidate sorting unit 44 then operate on the filtered receive signal to perform PSS detection in, e.g., the conventional manner. More specifically, the PSS filtering unit 40 is configured with a time-domain filter that matches the PSS for which the PSS detector 32 is searching. The PSS filtering unit 40 carries out linear filtering and may also derive other metrics and statistics, as will be understood by one of ordinary skill in the art. The peak detection unit 42 selects the output from the PSS filtering unit 40 with the best metrics (e.g., power, quality, or both) and passes on information related to the selected output to the candidate sorting unit 44. The candidate sorting unit 44 then filters out a pre-determined number of the most relevant/likely cell candidates from the plurality of peaks provided by the peak detection unit 42.

In other embodiments, the adaptive filtering unit 38 includes multiple adaptive filters each for a different sub-band of the frequency band of interest for PSS detection, as discussed below in detail. The adaptive filtering unit 38 then provides a separate filtered receive signal for each sub-band. In this case, the PSS filtering unit 40 performs PSS matched filtering per sub-band and thereafter combines the resulting signals. Alternatively, regardless of implementation of the adaptive filtering unit 38, the PSS filtering can be done on each receive signal prior to adaptive filtering.

Figure 5A:
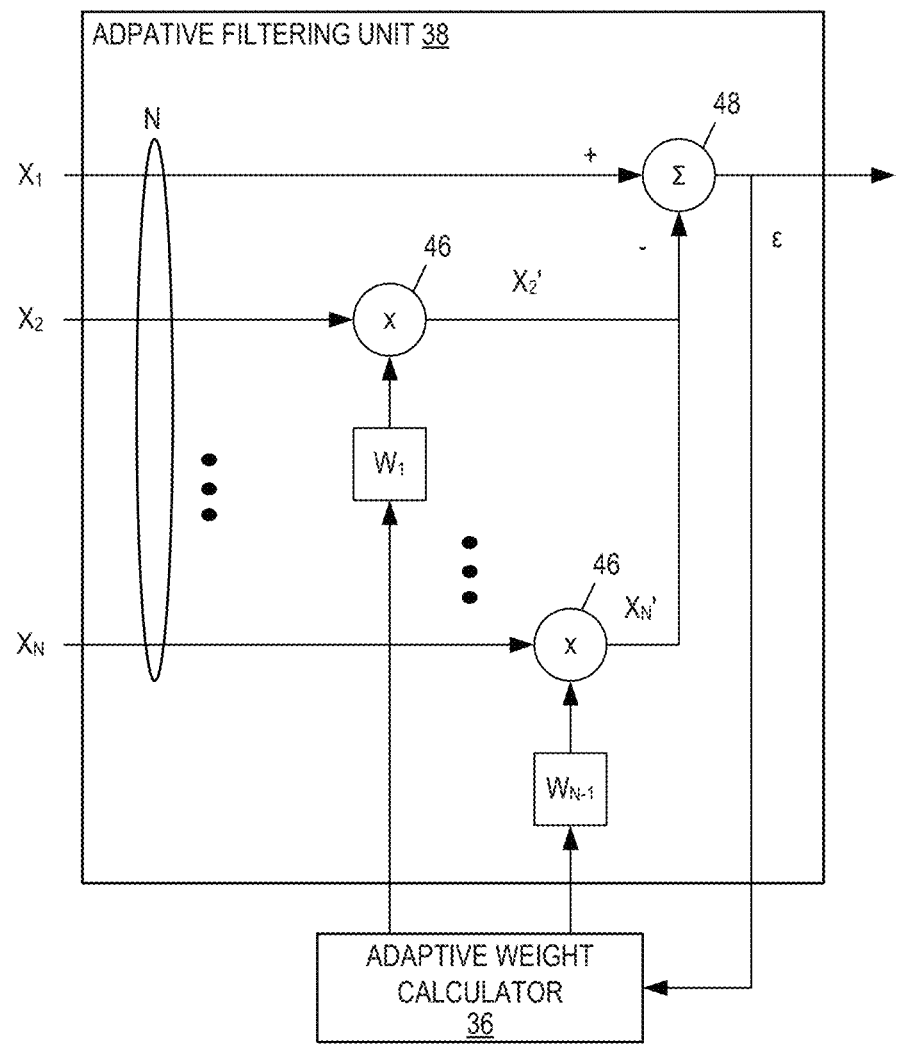
FIGS. 5A and 5B are block diagrams that illustrate two embodiments of an adaptive filtering unit of the PSS detector of FIGS. 3 and 4.
Figure 5B:
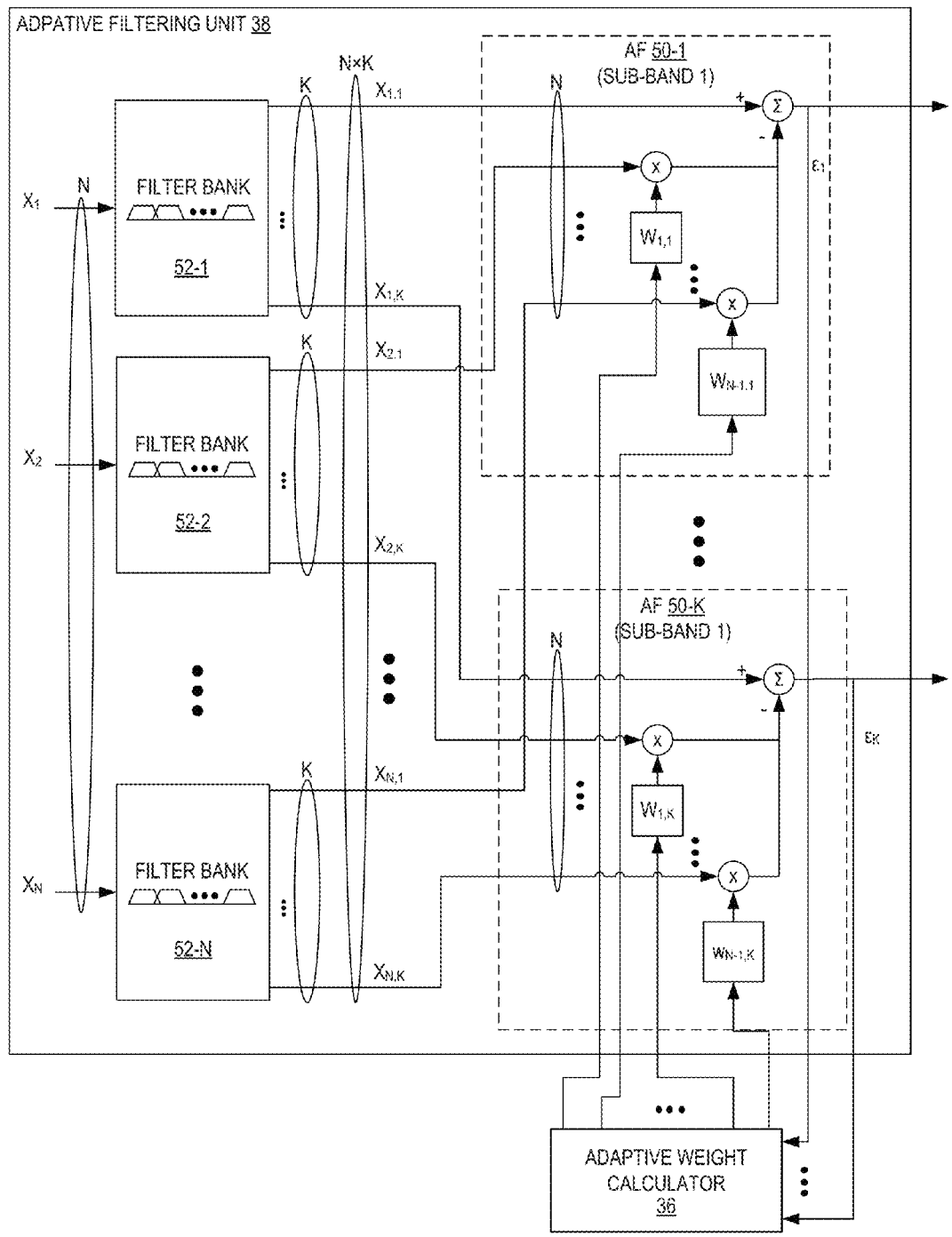

FIGS. 5A and 5B illustrate two example embodiments of the adaptive filtering unit 38 of FIG. 4 according to some embodiments of the present disclosure. In particular, FIG. 5A illustrates an example in which the adaptive filtering unit 38 includes a single adaptive filter that operates across the full bandwidth of interest for PSS detection. This single adaptive filter operates based on a single set of weights for the full bandwidth of interest for PSS detection. As illustrated, receive signals $X_1$ through $X_N$ from the N active Rx antennas, respectively, are received by the adaptive filtering unit 38. In this example, the adaptive filter includes multipliers 46 that apply combining weights $W_1$ through $W_{N-1}$ to the receive signals $X_2$ through $X_N$, respectively, to provide corresponding weighted receive signals $X_2'$ through $X_N'$. Since it is the relative phase that is of interest, one of the received signals can be used as reference; in this example $X_1$ is reference and thus has the implicit weight 1. A combiner 48 then combines the receive signal $X_1$ with the weighted receive signals $X_2'$ through $X_N'$ to provide the filtered signal.

The adaptive weight calculator 36 configures the combining weights $W_1$ through $W_{N-1}$ such that the (power of) the filtered signal (or error signal c) is minimized. When one or more strong interferers are present, the combining weights $W_1$ through $W_{N-1}$ of the adaptive filter are configured such that they suppress transmissions from the perceived direction(s) of the source(s) of the strong interferer(s). While there are many known algorithms for adaptively configuring the combining weights of an adaptive filter, one example is the leaky Least Means Squared (LMS) adaptive filter algorithm which updates the filter coefficient as $W_{N,i+1} = \gamma W_{N,i} + 2\mu c X_{N,i}$, where i is a time index, $\gamma$ is a leakage factor, and $\mu$ is a predetermined step size which defines how fast the algorithm converges.

When training the combining weights $W_1$ through $W_{N-1}$, the adaptive weight calculator 36 may consider the error signal c at all times (i.e., consider all portions of the receive signals $X_1$ through $X_N$). In this case, the adaptive filter will suppress the interference very well but will also suppress the desired signal from the unknown cell that is desired to be detected particularly when no strong interference is present. In order to lessen the suppression of the desired signal, when using, e.g., the leaky LMS algorithm, the parameter γ can be configured such that history is forgotten so that the combining weights are constantly changed. As a result, there will be less suppression of the desired signal (but also less suppression of the interference).

Alternatively, when training the combining weights $W_1$ through $W_{N-1}$, the adaptive weight calculator 36 may consider the error signal ϵ only for a select portion(s) of the receive signals $X_1$ through $X_N$. For example, the adaptive weight calculator 36 may consider the error signal ϵ only during time intervals with high power as compared to the rest of the time intervals of the receive signals $X_1$ through $X_N$. These time intervals with high power can be assumed to be time intervals during which strong interferer(s) are present. By configuring the combining weights $W_1$ through $W_{N-1}$ only during time intervals with high power, the interference can be suppressed very well (e.g., near perfectly) while avoiding suppression of the desired signals during times intervals in which no strong interferer is received.

By adaptively configuring the combining weights $W_1$ through $W_{N-1}$ to minimize the resulting power of the output/error signal, the adaptive filter removes the part of the receive signal $X_1$ that is correlated to the receive signals $X_2$ through $X_N$. As long as the interferer(s) is(are) a dominant interferer(s) and the signal (PSS) from an unknown cell is much weaker than interferer(s), it can be shown that the combining weights are used to cancel the dominant interferer(s) since the correlation between the different receive signals $X_1$ though $X_N$ is (almost) only based on the dominant interferer(s). If there are only two active Rx antennas used for the adaptive filtering, the adaptive filter will operate to remove the main or strongest interferer. If there are more than two active Rx antennas used for adaptive filtering, then the adaptive filter will operate to remove up to N−1 strongest interferers.

As discussed above, in some embodiments, the adaptive filtering unit 38 may include multiple adaptive filters for multiple sub-bands of the frequency band of interest for PSS detection. In this regard, FIG. 5B illustrates one example of the adaptive filtering unit 38 that includes multiple adaptive filters (AFs) 50-1 through 50-K for K sub-bands of the frequency band of interest for PSS detection. As illustrated, the receive signals $X_1$ through $X_N$ are filtered by filter banks 52-1 through 52-N, respectively, to provide sub-band receive signals $X_{1,1}$ through $X_{1,K}$ (from the receive signal $X_1$), sub-band receive signals $X_{2,1}$ through $X_{2,K}$ (from the receive signal $X_2$), etc. The sub-band receive signals $X_{1,1}$ through $X_{N,1}$ for sub-band 1 are adaptively filtered by the adaptive filter 50-1 based on corresponding combining weights $W_{1,1}$ through $W_{N-1,1}$ for sub-band 1, the sub-band receive signals $X_{1,2}$ through $X_{N,2}$ for sub-band 2 are adaptively filtered by the adaptive filter 50-2 (not shown) based on corresponding combining weights $W_{1,2}$ through $W_{N-1,2}$ for sub-band 2, etc. The adaptive filters 50-1 through 50-K output filtered signals for the sub-bands 1 through K, respectively. Corresponding error signals $\epsilon_1$ through $\epsilon_K$ are provided by the adaptive weight calculator 36, which uses the error signals $\epsilon_1$ through $\epsilon_K$ to adaptively configure the combining weights for the sub-bands as described above.

Figure 6:
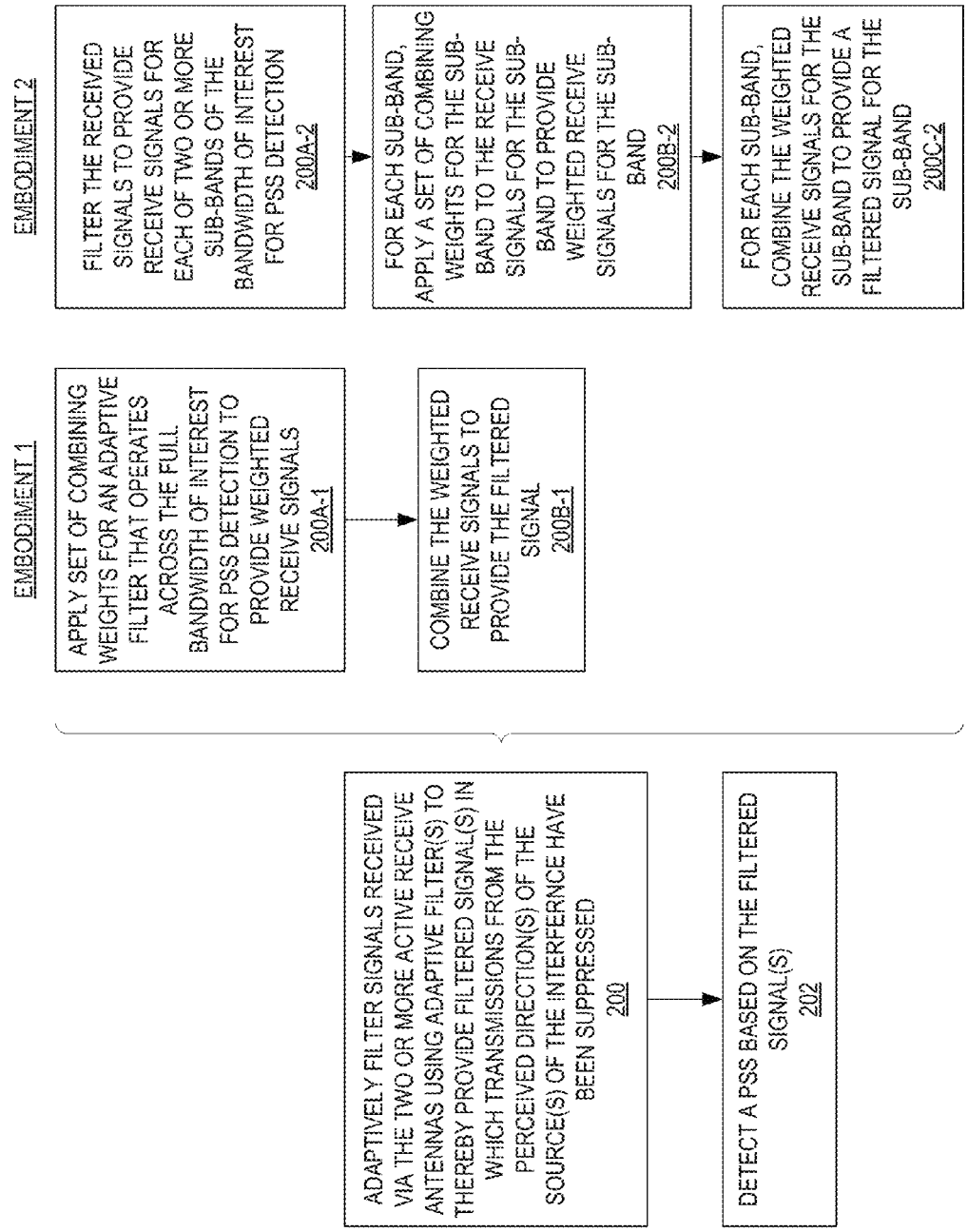
FIG. 6 is a flow chart that illustrates the operation of the PSS detector of FIGS. 3 and 4 according to some embodiments of the present disclosure.

FIG. 6 is a flow chart that illustrates the operation of the PSS detector 32 according to some embodiments of the present disclosure. As illustrated, the PSS detector 32, and in particular the adaptive filtering unit 38, adaptively filters the receive signals $X_1$ through $X_N$ received via the N active Rx antennas to thereby provide the filtered signal(s) in which transmissions from the perceived direction(s) of the source(s) of the interference have been suppressed (step 200). The PSS detector 32 then detects a PSS from an unknown cell based on the filtered signal(s) (step 202).

As illustrated in some embodiments, the receive signals $X_1$ through $X_N$ are adaptively filtered using an adaptive filter that operates on the full bandwidth of interest for PSS detection. Specifically, the adaptive filtering unit 38 of the PSS detector 32 applies a set of combining weights (e.g., the combining weights $W_1$ through $W_{N-1}$) for the adaptive filter to the receive signals $X_1$ through $X_N$ (step 200A-1) and combines the weighted receive signals to provide the filtered signal (step 200B-1).

In other embodiments, the receive signals $X_1$ through $X_N$ are adaptive filtered using multiple adaptive filters that operate on different sub-bands of the bandwidth of interest for PSS detection. Specifically, the receive signals $X_1$ through $X_N$ are each filtered to provide corresponding sub-band receive signals $X_{1,1}$ through $X_{1,K}$ (from the receive signal $X_1$), sub-band receive signals $X_{2,1}$ through $X_{2,K}$ (from the receive signal $X_2$), etc. (step 200A-2). For each sub-band k, the sub-band receive signals $X_{1,k}$ through $X_{N,k}$ for sub-band k are adaptively filtered by applying a set of weights $W_{1,k}$ through $W_{N-1,k}$ for sub-band k to the respective sub-band receive signals and then combining the weighted sub-band receive signals for sub-band k to provide the filtered signal for sub-band k, as described above with respect to FIG. 5B (steps 200B-2 and 200C-2).

Figure 7:
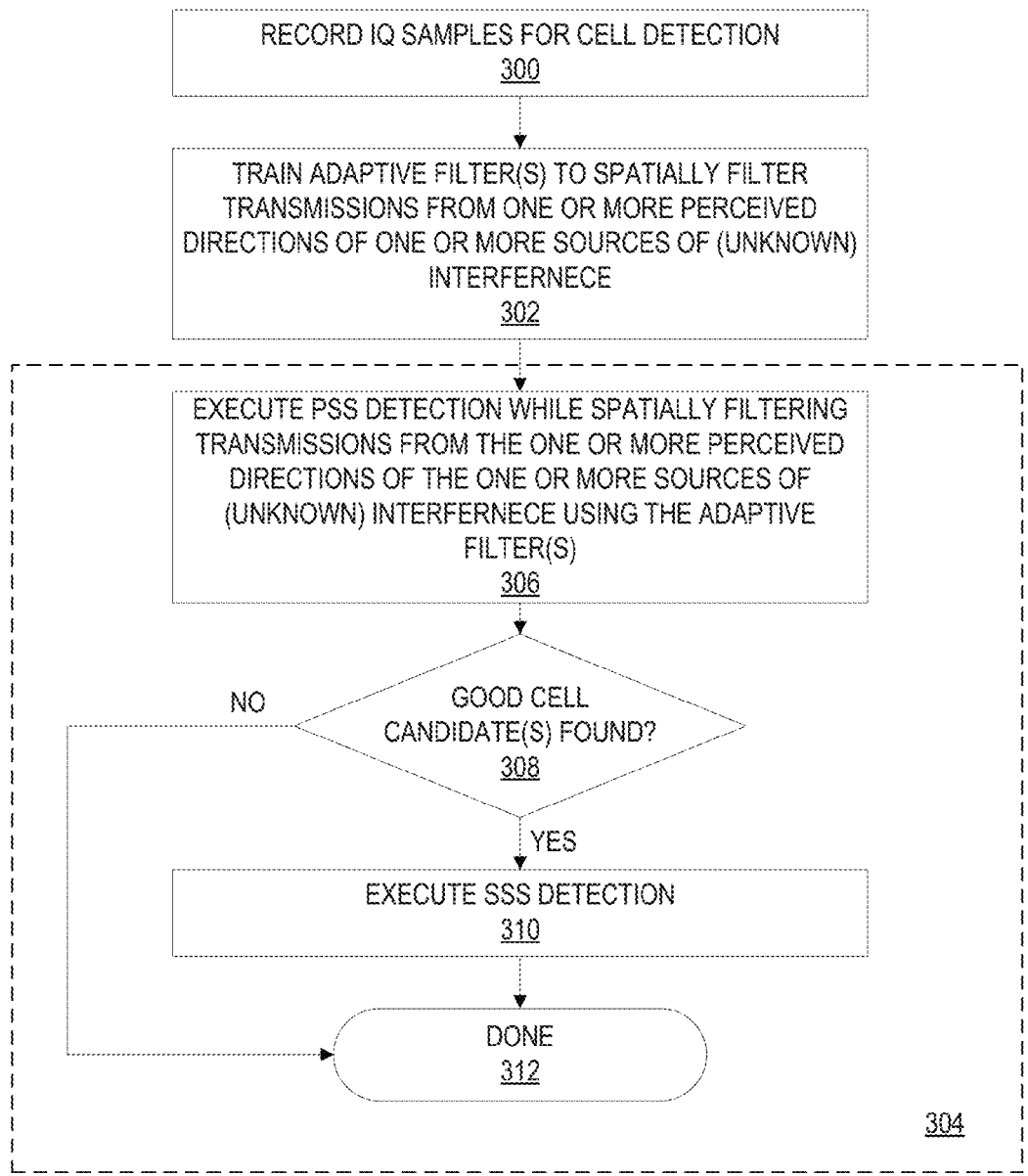
FIG. 7 is a flow chart that illustrates the operation of the UE of FIG. 3 to perform cell detection while suppressing interference according to some embodiments of the present disclosure.

FIG. 7 is a flow chart that illustrates the operation of the UE 20 (e.g., the UE 20 of FIGS. 3 and 4) to perform cell detection using the adaptive filter(s) to suppress transmissions from the perceived direction(s) of the source(s) of (unknown) interference according to some embodiments of the present disclosure. As illustrated, the UE 20 records IQ samples of the received signals from the active Rx antennas (step 300). For LTE, the IQ samples may be recorded, or buffered, for 5 milliseconds (ms) or more (e.g., 5 to 6 ms). Then, using the recorded IQ samples, the UE 20 trains the adaptive filter(s) to spatially filter transmissions from the perceived direction(s) of the source(s) of the potentially unknown interference (step 302). The UE 20 then performs cell detection using the adaptive filter(s) (step 304). Notably, steps 302 and 304 correspond to embodiments of steps 100 and 102 of FIG. 2.

As illustrated, in order to perform cell detection, the UE 20 executes PSS detection (e.g., via the PSS detector 32) while spatially filtering transmissions from the perceived direction(s) of the source(s) of the interference using the adaptive filter(s) (step 306). Notably, while steps 302 and 306 are illustrated separately, as discussed above, the adaptive filter(s) may, in some embodiments, be trained during execution of PSS detection. The UE 20 determines whether a good cell candidate(s) is found (step 308). A good cell candidate(s) is found if, for example, the peak detection unit 42 detects a correlation peak for a PSS that is greater than a predetermined threshold. If no good cell candidate is found, the process ends (step 312). However, if a good cell candidate(s) is found, the UE 20 then executes SSS detection using the combining weights for the adaptive filter(s) that correspond to the detected PSS (step 310). The process then ends (step 312).

Notably, while not illustrated, the UE 20 may repeat cell detection without adaptive filtering. As discussed above, this may be beneficial in order to not degrade cell detection for a cell(s) for which the UE 20 receives transmission (e.g., PSS and SSS) from the perceived direction(s) blocked by the adaptive filter(s). In addition, this may be beneficial in embodiments where the adaptive filter(s) are configured using the full received signals (i.e., not just portions of the received signals in which the strong interferer(s) is(are) present).

Figure 8:
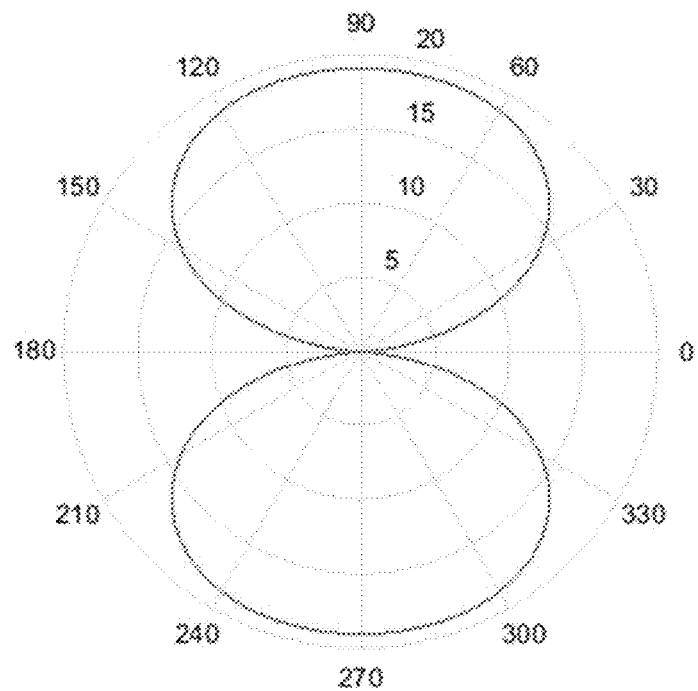
FIG. 8 illustrates one example of an antenna directivity pattern resulting from an adaptive filtering scheme according to some embodiments of the present disclosure.

FIG. 8 illustrates one example of an antenna directivity pattern resulting from the adaptive filtering scheme described herein. In this example, there are two active Rx antennas, the combining weights for adaptive filtering are adapted to a received interference signal with Signal to Noise Ratio (SNR)=6 decibels (dB), and the received interference signal is received from a perceived direction that is perpendicular to the Rx antenna array. In this example, the suppression in the perceived direction of the source of the interference is almost 20 dB. The depth of the notch in FIG. 8 depends on the SNR where the signal is the interferer and the noise is the signal from all other sources. In this case, with SNR=6 dB, the suppression is between 15 and 20 dB. With lower SNR, the notch will be less deep and, as a result, there will be less suppression of the interference. Conversely, with higher SNR, the notch will be deeper and, as a result, there will be more suppression of the interference.

Figure 9:
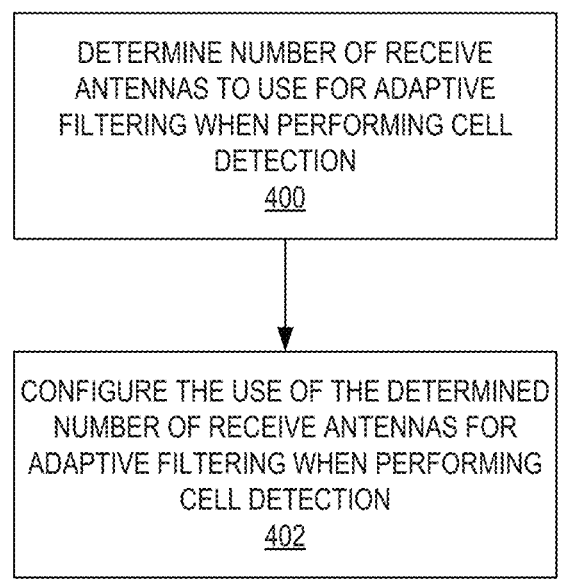
FIG. 9 is a flow chart that illustrates the operation of a UE to determine a number of receive antennas to utilize for adaptive filtering when suppressing interference during cell detection according to some embodiments of the present disclosure.

As discussed above, in some embodiments, the UE 20 determines the number of Rx antennas to use for adaptive filtering. In this regard, FIG. 9 is a flow chart that illustrates the operation of the UE 20 (e.g., the control unit 30) to determine the number of Rx antennas to use for adaptive filtering and configure the use of the determined number of Rx antennas according to some embodiments of the present disclosure. As illustrated, the UE 20 determines the number of Rx antennas to use for adaptive filtering when performing cell detection (step 400). As discussed above, this determination may be made based on one or more predefined criteria such as, for example, the mobility of the UE 20, the number of cells already detected on the particular carrier, signaling from the cellular communications network 10, a configuration made by the cellular communications network 10, one or more predefined conditions (e.g., defined in one or more standards), a battery status of the UE 20, and/or a number of strong cells found by the UE 20 on other carriers and/or other RATs. The UE 20 then configures the use of the determined number of receive antennas for adaptive filtering when performing cell detection (step 402).

Figure 10:
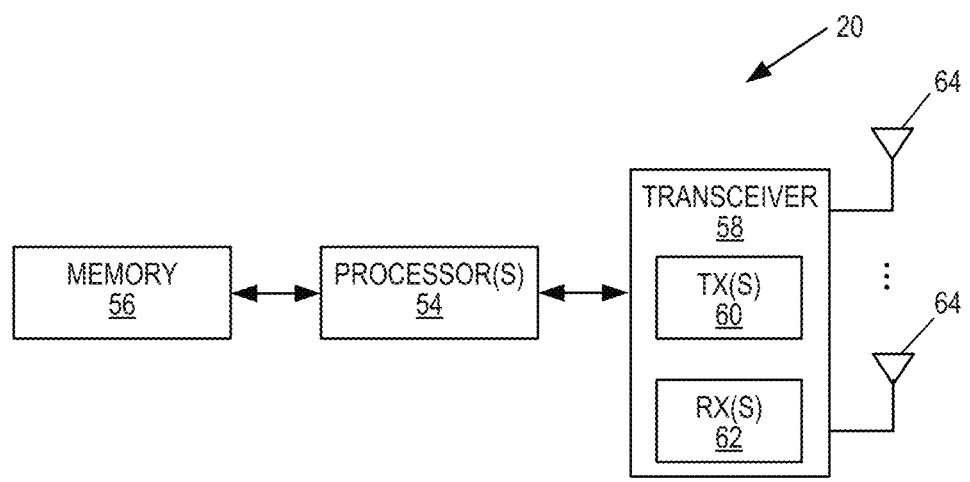
FIG. 10 is a block diagram of a UE according to some embodiments of the present disclosure.

FIG. 10 is a block diagram of the UE 20 according to some embodiments of the present disclosure. As illustrated, the UE 20 includes one or more processors, or processing circuitry, 54 (e.g., one or more microprocessors, Application Specific Integrated Circuits (ASICs), Field Programmable Gate Arrays (FPGAs), and/or the like), memory 56, and a transceiver, or transceiver circuitry, 58 including one or more transmitters 60 and one or more receivers 62 coupled to two or more antennas 64. The receiver(s) 62 correspond to the radio front-end receiver 24 of FIG. 3. In some embodiments, the functionality of the UE 20 (e.g., the digital filter 26, the PSS detector 32, the SSS detector 34, and the adaptive weight calculator 36) are implemented in a combination of hardware and software embodied in, in this example, the processor(s) 54 and software executable by the processor(s) 54 stored in the memory 56.

In some embodiments, a computer program including instructions which, when executed by at least one processor, causes the at least one processor to carry out the functionality of the UE 20 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56).

While not being limited to or by any particular benefit or advantage, embodiments of the present disclosure provide many benefits and advantages over conventional cell detection techniques. For instance, embodiments described herein allow spatial filtering or blocking of strong interferers to be carried out, thereby improving the SINR for signals arriving from perceived directions than the perceived direction(s) of the suppressed interference. This enables faster detection of neighbor cells, which is especially important in small cell deployment or ultra-dense deployments, giving more time to appropriately carry out a handover.

Further, embodiments of the present disclosure provide improved detection of new cells when there is a dominant interferer(s) that cannot be cancelled by using the channel estimates of the source (unknown) interference. It is possible to detect a new cell quicker than if cancellation is not done.

Still further, embodiments of the present disclosure can be implemented with insignificant impact on the complexity of the UE 20 compared to, e.g., legacy LTE UEs (i.e., LTE 3GPP Release 8-9 UEs).

Another advantage is that, compared to interference cancellation based on subtraction of synchronization signals from known cell(s), embodiments of the present disclosure can additionally suppress other signals sent from the same (set of) physical antenna(s) as long as the propagation channel does not change significantly over the time frame in which the IQ samples used for each cell detection attempt are recorded.

The following acronyms are used throughout this disclosure.

3G $3^{rd}$ Generation
3GPP $3^{rd}$ Generation Partnership Project
ADC Analog-to-Digital Converter
ASIC Application Specific Integrated Circuit
dB Decibel
DRX Discontinuous Reception
eICIC Enhanced Inter-Cell Interference Coordination
eNB Enhanced or Evolved Node B
EUTRA Evolved Universal Terrestrial Radio Access
feICIC Further Enhanced Inter-Cell Interference Coordination
FPGA Field Programmable Gate Array
HeNB Home Enhanced or Evolved Node B
ID Identity
LMS Least Means Squared
LTE Long Term Evolution
ms Millisecond
PSS Primary Synchronization Signal
RAN Radio Access Network
RAT Radio Access Technology
RB Radio Bearer
Rx Receive
SINR Signal to Interference Plus Noise Ratio
SNR Signal to Noise Ratio
SSS Secondary Synchronization Signal
TDD Time Division Duplexing
TDSCDMA Time Division Synchronous Code Division Multiple Access
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device to perform cell detection, comprising:
   training one or more adaptive filters to spatially filter transmissions from one or more perceived directions of one or more sources of unknown interference; and
   performing cell detection using the one or more adaptive filters to spatially filter transmissions from the one or more perceived directions of the one or more sources of the unknown interference.

2. The method of claim 1 wherein performing cell detection using the one or more adaptive filters comprises executing primary synchronization signal detection while spatially filtering transmissions from the one or more perceived directions of the one or more sources of the unknown interference using the one or more adaptive filters.

3. The method of claim 2 wherein executing primary synchronization signal detection comprises:
   adaptively filtering signals received via two or more active receive antennas of the wireless device using the one or more adaptive filters to thereby provide one or more filtered signals in which transmissions from the one or more perceived directions of the one or more sources of the unknown interference have been suppressed; and
   detecting a primary synchronization signal based on the one or more filtered signals.

4. The method of claim 3 wherein the one or more adaptive filters is a single adaptive filter, the one or more filtered signals is a single filtered signal, and adaptively filtering the signals received via the two or more active receive antennas of the wireless device comprises:
   applying a set of weights for the single adaptive filter to the signals to provide weighted signals; and
   combining the weighted signals to provide the single filtered signal;
   wherein the set of weights is a single set of weights for a full bandwidth in which the primary synchronization signal is to be detected.

5. The method of claim 3 wherein:
   the one or more adaptive filters is two or more adaptive filters for two or more sub-bands of a bandwidth in which the primary synchronization signal is to be detected, respectively;
   the one or more filtered signals is two or more filtered signals; and
   adaptively filtering the signals received via the two or more active receive antennas of the wireless device comprises:
      filtering the signals received via the two or more active receive antennas to provide received signals for each of the two or more sub-bands; and
      for each sub-band k of the two or more sub-bands:
         applying a set of weights for the sub-band to the received signals for the sub-band to provide weighted signals for the sub-band; and
         combining the weighted signals for the sub-band to provide the filtered signal for the sub-band.

6. The method of claim 1 further comprising determining a number of receive antennas of the wireless device to utilize for the one or more adaptive filters when performing cell detection.

7. The method of claim 6 wherein determining the number of receive antennas of the wireless device to utilize for the one or more adaptive filters when performing cell detection comprises determining the number of receive antennas of the wireless device to utilize based on at least one of a group consisting of:
   mobility of the wireless device;
   a number of cells already detected by the wireless device on the same carrier frequency;
   signaling from a cellular network node serving the wireless device;
   a configuration from the cellular network node serving the wireless device;
   one or more predefined rules;
   a battery status of the wireless device;
   a number of strong cells already detected by the wireless device on one or more other carriers; and
   a number of strong cells already detected by the wireless device on one or more other radio access technologies.

8. The method of claim 1 wherein a signal strength of the unknown interference is strong relative to a signal strength of one or more predetermined signals utilized for cell detection.

9. A wireless device configured to perform cell detection, comprising:
   circuitry operative to train one or more adaptive filters to spatially filter transmissions from one or more perceived directions of one or more sources of unknown interference; and
   circuitry operative to perform cell detection using the one or more adaptive filters to spatially filter transmissions from the one or more perceived directions of the one or more sources of the unknown interference.

10. The wireless device of claim 9 wherein the circuitry operative to perform cell detection using the one or more adaptive filters comprises a primary synchronization signal detector comprising the one or more adaptive filters, the primary synchronization signal detector being operative to perform primary synchronization signal detection while spatially filtering transmissions from the one or more perceived directions of the one or more sources of the unknown interference using the one or more adaptive filters.

11. The wireless device of claim 9 wherein the circuitry operative to train the one or more adaptive filters comprises an adaptive weight calculator operative to adaptively configure one or more sets of weights for the one or more adaptive filters.

12. The wireless device of claim 10 wherein the primary synchronization signal detector comprises:
   an adaptive filtering unit comprising the one or more adaptive filters operative to adaptively filter signals received via two or more active receive antennas of the wireless device to thereby provide one or more filtered signals in which transmissions from the one or more perceived directions of the one or more sources of the unknown interference have been suppressed; and
   circuitry operative to detect a primary synchronization signal based on the one or more filtered signals.

13. The wireless device of claim 10 wherein the one or more adaptive filters is a single adaptive filter, the one or more filtered signals is a single filtered signal, and the single adaptive filter is operative to:
   apply a set of weights for the single adaptive filter to the signals to provide weighted signals; and
   combine the weighted signals to provide the single filtered signal;
   wherein the set of weights is a single set of weights for a full bandwidth in which the primary synchronization signal is to be detected.

14. The wireless device of claim 10 wherein:

the one or more adaptive filters is two or more adaptive filters for two or more sub-bands of a bandwidth in which the primary synchronization signal is to be detected, respectively;

the one or more filtered signals is two or more filtered signals; and the adaptive filtering unit is operative to:

filter the signals received via the two or more active receive antennas to provide received signals for each of the two or more sub-bands; and for each sub-band of the two or more of sub-bands, via a corresponding one of the two or more adaptive filters:

apply a set of weights for the sub-band to the received signals for the sub-band to provide weighted signals for the sub-band; and combine the weighted signals for the sub-band to provide the filtered signal for the sub-band.

15. The wireless device of claim 10 further comprising a control unit operative to determine a number of receive antennas of the wireless device to utilize for the one or more adaptive filters and for performing cell detection using the one or more adaptive filters.

16. The wireless device of claim 15 wherein the control unit is operative to determine the number of receive antennas of the wireless device to utilize for the one or more adaptive filters and for performing cell detection using the one or more adaptive filters based on at least one of a group consisting of:

mobility of the wireless device;

a number of cells already detected by the wireless device on the same carrier frequency;

signaling from a cellular network node serving the wireless device;

a configuration from the cellular network node serving the wireless device;

one or more predefined rules;

a battery status of the wireless device;

a number of strong cells already detected by the wireless device on one or more other carriers; and a number of strong cells already detected by the wireless device on one or more other radio access technologies.

17. The wireless device of claim 9 wherein a signal strength of the unknown interference is strong relative to a signal strength of one or more predetermined signals utilized for cell detection.

18. A wireless device configured to perform cell detection, comprising:

receiver circuitry coupled to two or more receive antennas;

one or more processors; and memory containing software exactable by the one or more processors whereby the wireless device is operative to:

train one or more adaptive filters to spatially filter transmissions from one or more perceived directions of one or more sources of unknown interference; and perform cell detection using the one or more adaptive filters to spatially filter transmissions from the one or more perceived directions of the one or more sources of the unknown interference.

* * * * *

UNITED STATES PATENT AND TRADEMARK OFFICE
CERTIFICATE OF CORRECTION

PATENT NO. : 9,509,427 B2  
APPLICATION NO. : 14/693649  
DATED : November 29, 2016  
INVENTOR(S) : Palenius et al.

Page 1 of 1

It is certified that error appears in the above-identified patent and that said Letters Patent is hereby corrected as shown below:

On the Title Page

In item (72), under "Inventors", in Column 1, Line 3, delete "Kävilinge" and insert -- Kävlinge --, therefor.

On Page 2, in item (56), under "OTHER PUBLICATIONS", in Column 2, Line 6, delete "Lisheng, L. et al.," and insert -- Lisheng, Fan et al., --, therefor.

In the Specification

In Column 10, Line 48, delete "signal c)" and insert -- signal ε) --, therefor.

In Column 10, Line 62, delete "signal c" and insert -- signal ε --, therefor.

In Column 11, Line 8, delete "signal c" and insert -- signal ε --, therefor.

In Column 11, Line 10, delete "signal c" and insert -- signal ε --, therefor.

In Column 11, Line 29, delete "though" and insert -- through --, therefor.

Signed and Sealed this  
Eleventh Day of April, 2017

Michelle K. Lee  
*Director of the United States Patent and Trademark Office*